United States Patent

[11] 3,571,568

[72] Inventors Shu Ono
Yamato-shi;
Eiichi Goto, Koganei-shi; Tadao Mitsui,
Yokohama, Japan

[21] Appl. No. 712,455
[22] Filed Mar. 12, 1968
[45] Patented Mar. 23, 1971
[73] Assignee Hitachi, Ltd.
Tokyo, Japan
[32] Priority Mar. 17, 1967
[33] Japan
[31] 42/16381

[54] CARD PROCESSING SYSTEM
3 Claims, 6 Drawing Figs.

[52] U.S. Cl. .......... 235/61.1, 234/47
[51] Int. Cl. .......... G06k 1/05, G06k 1/18
[50] Field of Search .......... 234/59, 60, 61, 62, 63, 47, 48, 49; 235/61.11 (Cursory), 61.10

[56] References Cited

UNITED STATES PATENTS

| | | | |
|---|---|---|---|
| 2,439,029 | 4/1948 | Welk | 234/47 |
| 2,651,363 | 9/1953 | Hooe | 234/47 |
| 2,799,452 | 7/1957 | Maul | 234/61X |
| 2,825,503 | 3/1958 | Hooe | 235/61.1 |
| 3,035,764 | 5/1962 | Beman | 235/61.1X |

*Primary Examiner*—Maynard R. Wilbur
*Assistant Examiner*—Robert M. Kilgore
*Attorney*—Craig, Antonelli, Stewart & Hill

ABSTRACT: This specification discloses a card processing system wherein use is made of partition cards having open apertures formed in the periphery thereof as means for making distinctions between a plurality of card groups to be distinguished from each other in an attempt to take out outputs corresponding to the perforations of said plurality of card groups in an electronic computer system including at least a central processing unit, a card-punch controlling unit and a card punch, thereby reducing the operator's intervention and eliminating the use of any expensive auxiliary machine.

CARD PROCESSING SYSTEM

BACKGROUND OF THE INVENTION

This invention relates to an improved card processing system, and more particularly it pertains to such a system wherein when cards are punched in accordance with output information segments corresponding to a variety of jobs ("-job" means a unit to be processed by an electronic computer) by means of a card-punch connected with an electronic computer, the boundaries between output card groups corresponding to the respective jobs or those between a plurality of output card groups corresponding to a plurality of portions in the same job can be made clear.

Recently, in order to enhance the efficiency in use of an electronic computer, a softwear system referred to, for example, as a "monitor" system (or operating system) or the like, has been developed, thereby continuously processing a plurality of jobs to reduce the operator's intervention as much as possible.

Conventionally, it has been the practice, in an attempt to punch cards in accordance with results provided by an electronic computer, to have successive card groups removed from an output stacker (referred to as stacker hereinafter) when the cards have been punched in accordance with outputs corresponding to one job, and thereafter the punching in accordance with the outputs corresponding to the next job is performed, thereby making distinctions between the outputs corresponding to the respective portions of a job. However, such a method requires the operator's intervention so that the efficiency in use of the electronic computer is greatly decreased. To solve problems, such a method using either such punched card machines as a collating machine, a sorting machine or the like or other special card-punch may be resorted to, but it is disadvantageous since these machines are very expensive.

SUMMARY OF THE INVENTION

It is a primary object of this invention to provide an improved card processing system requiring no such auxiliary machines as described above and so designed that a plurality of output card groups corresponding to a plurality of portions of a job or a plurality of portions in the same job can be easily distinguished from each other in an electronic computer and a card-punch connected with the computer in the manner of "on-line".

Other objects, features and advantages of the present invention will become apparent from the following description taken in conjunction with the accompanying drawings.

DESCRIPTION OF THE PREFERRED EMBODIMENTS

First of all, description will be made of an example of the conventional system of this type.

Figure 1:
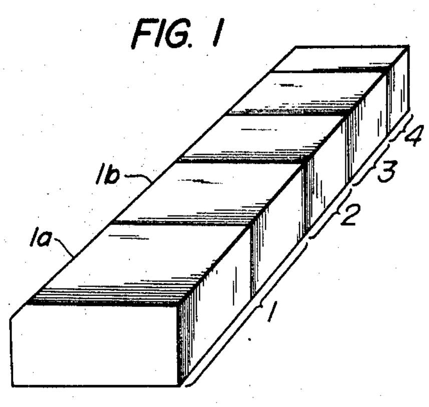
FIG. 1 is a perspective view showing groups of cards perforated in accordance with input information for performing several types of jobs by an electronic computer, as placed on the input hopper of a card reader.

In FIG. 1, the reference numerals 1, 2, 3 and 4 represent groups of cards perforated in accordance with input information for performing a single job as described above, and 1*a* and 1*b* represent card groups perforated in accordance with programs for executing the respective jobs and data required for such purposes. The card groups indicated by 2, 3 and 4 are also perforated in accordance with programs and data. The card groups 1 to 4 are marked off by inserting red cards at their boundaries. Further card groups for several jobs may be placed on the input hopper (simply referred to as hopper hereinafter) if its capacity permits.

Figure 2:
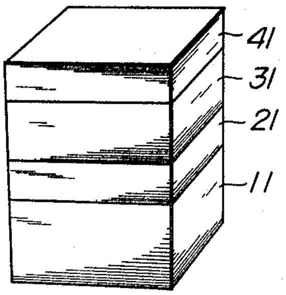
FIG. 2 is a perspective view showing groups of cards perforated in accordance with output information representing the results of several types of jobs, as placed on the output stack of a card-punch.
Figure 3:
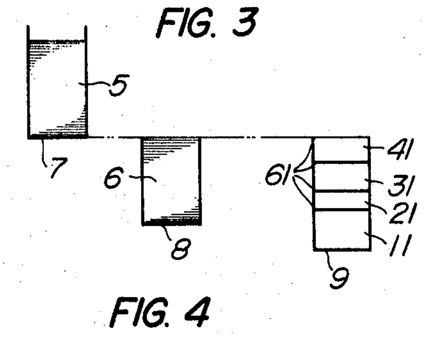
FIG. 3 is a schematic view showing a punched card machine useful for explaining the conventional card processing system.
Figure 6:
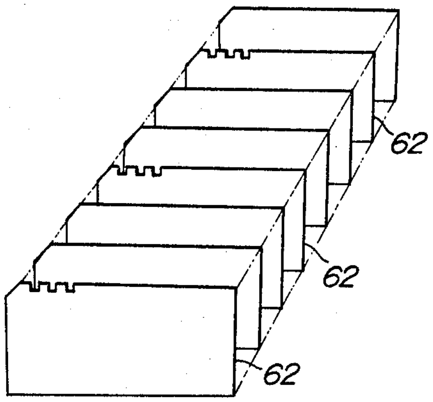
FIG. 6 is a perspective view showing card groups useful for explaining the present invention.

The information carried by the card groups of FIG. 1 may be transferred to a magnetic tape and read out from a magnetic tape apparatus. In the case of an electronic computer, the card groups 1 to 4 are sequentially read by means of a monitor program or the like so that the job corresponding to the input information provided by the card groups 1 to 4 is continuously processed, and the resulting output information is also continuously supplied to a card-punch. (Of course, at this time, the other output information is supplied to another output device such as a printer or the like). As shown in FIG. 2, card groups 11 to 41 are successively perforated in such a manner that the card group 11 is perforated in accordance with the output resulting from the job corresponding to the input of the card group 1, the card group 21 is perforated in accordance with the output resulting from the job corresponding to the input of the card group 2, and so on, and these card groups are piled up on the stacker of the card-punch. Since the card-punch is so designed as to sequentially punch unpunched cards one by one, it is impossible to make a distinction between the card groups 11 to 41 without checking the contents represented by the perforations of the cards, in case the output cards are in the aforementioned state. For this reason, use is made of such punched card machines as a collating machine, a sorting machine or the like. Such a punched card machine is shown in FIG. 3 wherein the card groups 11 to 41 (indicated at 5) are loaded in a hopper 7 and cards 6 (for example, red cards) which can be distinguished from the cards 5 at a glance are loaded on another hopper 8. The reference numeral 9 denotes a stacker which is adapted to accommodate the cards delivered from the hoppers 7 and 8. In the path of the delivery of the cards from the hopper to the stacker 9, detection is made of the ends of the respective card groups in accordance with the contents represented by the perforations of the cards 5. Upon such detection, the cards 6 are inserted between the respective card groups, so that the boundary between the card groups 11 and 21, that between the card groups 21 and 31 and that between the card groups 31 and 41 can be recognized at a glance. However, to use such a machine auxiliarily causes drawbacks so that not only one additional step of operation is required but also provision must specially be made for expensive equipment.

Special card-punching machines capable of achieving the same purpose as that of the aforementioned machine without using the punched card machine described above are available, but all of them are expensive.

Figure 4:
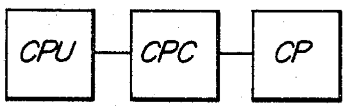
FIG. 4 is a block diagram showing an electronic computer system useful for explaining the present invention.

In accordance with the present invention, there is provided a novel card processing system which does not require such an expensive machine as described above. The electronic computer system adopted in the present invention includes at least three basic elements as shown in FIG. 4, that is, a central processing unit CPU, a card-punch controlling device CPC connected with the central processing unit CPU, and a card-punch CP connected with the controlling device CPC. The construction of and interconnection between these elements requires no detailed explanation as they are conventional and well known in the art. By way of explanation, however, the result of the operations within the central processing unit CPU are transported as card-punch information or data through the card-punch controlling device CPC to the card-punch CP, where the information or data is punched on a card. A row-by-row delivery-type card-punch is equipped with 80 punch knives and each of 12 timing pulses carries a line (80 columns) of card-punch data or information, while a column-by-column delivery-type card-punch is equipped with 12 punch knives and each of 80 timing pulses carries the 12-column cardspunch information data.

Figure 5:
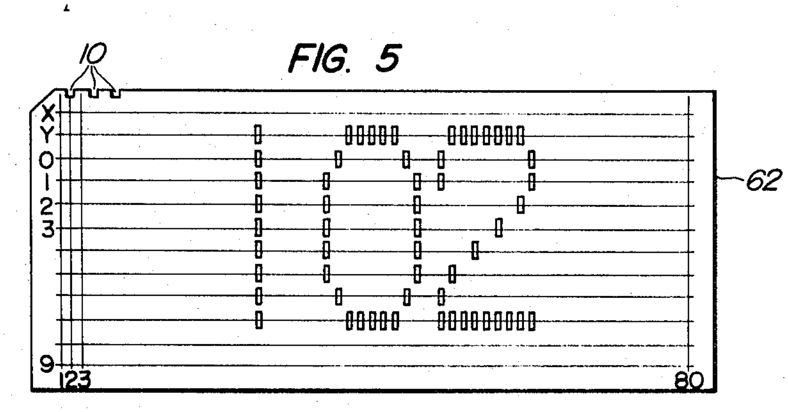
FIG. 5 is a view showing a card useful for explaining the present invention.

The most important feature of this invention is that by using cards having the periphery thereof partly punched as partition cards 62, the boundaries between the output card groups corresponding to works to be distinguished from each other or those between the output card groups corresponding to those portions in the same job which are to be distinguished can be recognized at a glance. The partition cards are prepared by the same method as that in which the respective cards are punched in accordance with the output information representing each job. More specifically, the periphery of the partition cards is partly punched in accordance with instructions imparted from the central processing unit to the card-punch controlling unit of the electronic computer. The result is that the partition cards are inserted. In the case of an 80-column card, punching up to 12 rows has conventionally been possible, whereas in accordance with the present invention, the partition card is punched in its periphery as the 13th row, as shown in FIG. 5. Such row is not necessarily located on the top end of the card but it may be provided on the bottom, left or right end thereof. The apertures formed in the 13th row are not closed ones such as data apertures, but they are open apertures as indicated at 10 in FIG. 5. No limitation is imposed upon the shape and size of the open apertures 10. Such shape and size can be optionally selected. This is true of a 90-column card and any other card. If such a partition card prepared by the above method is inserted in a position to be distinguished, the end line of the card is seen as being discontinued at the open apertures 10 so that the boundary between the adjacent output card groups can be recognized at a glance. By punching the partition card in a directly readable pattern such for example as numerical pattern of "102" as shown in FIG. 5, the types of the sections can be more clearly recognized.

The card processing method according to the present invention can be practiced by the following improvements.

In an attempt to form apertures in the 13th row with a row-by-row delivery-type card-punch, the number of timing pulses required by the card-punch is increased from 12 to 13 so that the central processing unit, card-punch controlling device and card-punch are improved so as to be adapted thereto. If apertures 10 are to be formed either in the left or right end portion of the card, then a punching knife is mounted in such a manner as to be able to form open apertures in the periphery of the card, and the respective devices are improved as described above. In the case of a column-by-column delivery-type card punch, too, the improvements described above can easily be effected.

More specifically, in the case of a row-by-row delivery-type card-punch, if the 13th line is to be punched, an improvement has been made in such a manner that the number of timing pulses required for a card-punch is increased from 12 to 13. The first 12 timing pulses carry general output information while the 13th timing pulse carries information for partitioning card groups. As a result, partitioning information or data is punched on the 13th line, that is, open apertures are punched at the edge of the card. If one desires to punch open apertures 10 at the right or left edge of the card, another punch knife, in addition to the 80 punch knives, is installed for that purpose and each of the 12 timing pulses is made to carry a line (81 columns) of data containing partitioning information. The above-mentioned process also applies to a column-by-column delivery-type card-punch.

In order to provide a better understanding of the present invention, a simple concrete example thereof will now be described. In this example, the card group 1 is an input information card group for the job of calculating salaries, which consists of a subgroup of cards 1*a* punched in accordance with the program for the salary calculations, and another subgroup of cards 1*b* punched in accordance with a variety of data required for the salary calculations. The card group 2 is an input information card group for the job of calculations for inventory control, consisting of a subgroup of cards punched in accordance with a predetermined program and another subgroup of cards punched in accordance with data required for the calculations as is the case with the card group 1. To simplify the explanation, the card groups 3 and 4 are not described.

Assume that the job for the salary calculations is numbered 101, and that the job for the inventory control is numbered 102. The card groups 1 and 2 are continuously read out by the card reader in accordance with the instructions from the monitor program, and the jobs 1 and 2 are processed by the electronic computer so that the cards are punched in accordance with the results by means of the card punch. At the end of the output corresponding to the job for the salary calculations, an output is taken from the partition card which is punched in a pattern of the number 101 and formed with the open apertures in the periphery at the same time, in accordance with the instructions from the central processing unit of the electronic computer. Thus, the output card group for the job of inventory control is punched. Further, subsequent to the punching of the output cards for the job of inventory control, an output is taken from another partition card which is punched in a pattern of the number 102 and formed with the open apertures 10. In this way the two output card groups can be easily discriminated from each other by means of the partition cards. Moreover, it is possible to easily and clearly discriminate which is the output card group for the salary calculations, on the basis of the numerical pattern punched in the card.

As will be appreciated from the foregoing, the card processing system according to the present invention is characterized in that the use of any expensive machine as well as any additional step of auxiliary operation can be eliminated, and that an output card group corresponding to each job or a plurality of output card groups falling within one job can be easily sectioned as the cards are punched in the electronic computer.

Since the card processing system of the present invention is to be worked out by uniting the central processing unit, card-punch controlling device and card-punch of an electronic computer, such devices should be essentially improved, and such improvements also fall within the scope of the present card processing system.

We claim:

1. A card processing system comprising:

a central processing unit;

a card-punch controlling apparatus connected to said central processing unit; and means, having a plurality of card-punch knives, connected to said card-punch controlling apparatus, and being responsive to card-punch data and data for partitioning card groups delivered from said central processing unit through said card-punch controlling device, for sequentially punching out a plurality of card groups which are separately distinquishable according to said card-punch data, and for punching in at least one card, which serves as a partition card for each boundary between said card groups, apertures opening on the periphery thereof, according to said partitioning card data, respectively;

whereby the partitioning of said card groups may be identified at a glance at said apertures in said at least one partition card.

2. A card processing system according to claim 1, wherein said card-punch controlling apparatus includes means for delivering a first set of timing pulses to said punching means for punching out said plurality of card groups according to said card-punch data and a second set of timing pulses for driving said knives to punch in said at least one partition card said open apertures according to said card partitioning data.

3. A card processing system according to claim 1, wherein said plurality of punch knives includes separate sets of punch knives, responsive to said card partitioning data for punching said apertures, and responsive to said card-punch data for punching out said card groups, respectively.

UNITED STATES PATENT OFFICE

CERTIFICATE OF CORRECTION

Patent No. 3,571,568 Dated March 23, 1971

Inventor(s) Shu Ono, Eiichi Goto and Tadao Mitsui

It is certified that error appears in the above-identified patent and that said Letters Patent are hereby corrected as shown below:

On the first page, left hand column, line 3, Ellchi Goto should read -- Eiichi Goto --

Signed and sealed this 21st day of December 1971.

(SEAL)
Attest:

EDWARD M.FLETCHER,JR.
Attesting Officer

ROBERT GOTTSCHALK
Acting Commissioner of Patents